United States Patent
Dordoni et al.

(10) Patent No.: US 8,431,069 B2
(45) Date of Patent: Apr. 30, 2013

(54) MOULD FOR MOULDING A CONTAINER OBTAINED FROM A PARISON OF PLASTIC MATERIAL AND METHOD THEREOF

(75) Inventors: Claudio Dordoni, Parma (IT); Bernard Troadec, Pornic (FR)

(73) Assignee: GEA Procomac S.p.A., Sala Baganza (IT)

( * ) Notice: Subject to any disclaimer, the term of this patent is extended or adjusted under 35 U.S.C. 154(b) by 0 days.

(21) Appl. No.: 13/140,354

(22) PCT Filed: Sep. 10, 2009

(86) PCT No.: PCT/IB2009/053976
§ 371 (c)(1),
(2), (4) Date: Jun. 16, 2011

(87) PCT Pub. No.: WO2011/030184
PCT Pub. Date: Mar. 17, 2011

(65) Prior Publication Data
US 2012/0161370 A1    Jun. 28, 2012

(51) Int. Cl.
*B29C 49/42* (2006.01)
*B29C 49/48* (2006.01)

(52) U.S. Cl.
USPC .......................... 264/537; 425/534; 425/541

(58) Field of Classification Search .............. 425/522, 425/534, 540, 541; 264/523, 537, 538
See application file for complete search history.

(56) References Cited

U.S. PATENT DOCUMENTS

| | | | |
|---|---|---|---|
| 2,988,776 A * | 6/1961 | Schaich | 425/541 |
| 2,998,621 A | 9/1961 | Adams et al. | |
| 3,311,684 A | 3/1967 | Heider | |
| 3,465,073 A * | 9/1969 | Fogelberg et al. | 425/534 |
| 3,736,091 A * | 5/1973 | Reilly | 425/527 |
| 3,770,098 A | 11/1973 | Baugnies et al. | |
| 3,977,822 A * | 8/1976 | Reilly et al. | 425/529 |
| 4,122,141 A * | 10/1978 | Krall et al. | 425/534 |
| 4,317,793 A * | 3/1982 | Hubert et al. | 425/534 |
| 4,850,850 A * | 7/1989 | Takakusaki et al. | 425/534 |
| 7,998,356 B2 * | 8/2011 | Martini et al. | 216/24 |
| 8,118,587 B2 * | 2/2012 | Blochmann et al. | 425/534 |
| 2002/0037338 A1 | 3/2002 | Lisch | |
| 2009/0273118 A1 | 11/2009 | Blochmann et al. | |

FOREIGN PATENT DOCUMENTS

| | | |
|---|---|---|
| EP | 2113367 A2 | 11/2009 |
| FR | 2720679 A1 | 12/1995 |
| FR | 2874193 A1 | 2/2006 |

* cited by examiner

*Primary Examiner* — Robert B Davis
(74) *Attorney, Agent, or Firm* — Pearne & Gordon LLP (57) ABSTRACT

Mold (1) for molding a container (2) obtained from a parison (3) of plastic material/ comprising: two half-molds (4); means (5) for moving said half-molds (4) between a closed position in which said half-molds (4) define a cavity (6) for housing the parison (3) or the molded container (2), and an open position in which said half-molds (4) are moved away from each other to enable the extraction of the molded container (2) from the cavity (6) or the insertion of another parison (3) in said cavity (6); two jaws (7) movable between a configuration' of engagement and a configuration of disengagement with the parison (3) or the container (2) located in said cavity (6), said half-molds (4) defining an inner portion (9) of the mold (1) that is complementarily shaped relative to an outer profile (10) of the jaws (7) in such a way that said jaws (7) are enclosed, at least partially, by said half-molds (4).

11 Claims, 9 Drawing Sheets

ID-MOULD FOR MOULDING A CONTAINER OBTAINED FROM A PARISON OF PLASTIC MATERIAL AND METHOD THEREOF

TECHNICAL FIELD AND BACKGROUND ART

The present invention relates to a mould for moulding a container obtained from a parison of plastic material and a method thereof. In particular, said mould finds application in the bottling sector, e.g. in linear or rotary carousel blow-moulding machine.

As it is well-known, the blow-moulding process starts with the insertion of the parison inside the open mould and is completed with the extraction of the moulded container from said mould. These transfers are particularly critical since the parison and the container must be adequately supported.

Traditionally, these transfers are performed by means of two transfer star-wheels (one for transferring the parisons and another for transferring the containers) provided with several stations, each station being equipped with a dedicated gripper for pinching the parison or the container. For example, during the transfer of the parison from the star-wheel to the mould (or the transfer of the container from the mould to the star-wheel), the relative speed and path of the axis of the gripper should coincide with speed and path of the axis of symmetry of the mould (that means the axis of the parison or the container inside the mould) on the tangent point between the trajectory of grippers and moulds. Theoretically, this coincidence takes place in a single point and it lasts an infinitesimal time interval.

Nevertheless, at the state of the art, the transfer may envisage that the gripper moves according to a radial direction of the star-wheel. In alternative, the gripper rotates around an external point with respect to the line connecting the two axis mentioned above. Another known alternative consists in a combination of a linear and rotating movement of the gripper. Since these transfers are driven by mechanical equipments (motors, cams, rods, etc.) that have real timing characteristics, the interval of coincidence of the axis of the gripper with the axis of symmetry of the mould is finite (greater than an infinitesimal time interval). The longer is said interval, the larger is the stroke of the gripper and, thus, the higher is the cost and complexity of the whole machine. Moreover, a large stroke of the gripper determines a bigger pitch-line diameter of the star-wheel and, thus, a higher distance between the star-wheels.

Even more so, said distance between the star-wheels is linked to the dead angle of the blow-moulding machine. Indeed, an increase in the dead angle produces a decrease in the yeld of the blow-moulding process.

Moreover, another disadvantage of prior art solutions is linked to the fact that the parison must be disengaged by the gripper only after the mould has been closed around the parison so as to maintain it. On the other side, the container must be pinched by the gripper when the mould is still closed.

Another drawback, described hereafter, must be pointed out when dealing with prior art solutions. In case of parison with upward-oriented mouth, the parison is maintained in the cavity defined by the mould thanks to the specific enlargement obtained in proximity of the mouth. In case of parison with downward-oriented mouth, the enlargement cannot be used to support the parison since it serves for applying the blowing nozzle. In this case, other dedicated supporting member must be employed.

Prior art solutions are known from EP2113367, U.S. Pat. Nos. 3,311,684, 2,998,621 and FR2874193. Nevertheless, all these solutions suffers of non-instantaneous disengaging of the parison and, in some cases, of bulky design. In this context, the technical task at the basis of the present invention is to provide a mould for moulding a container obtained from a parison of plastic material and method thereof, which overcome the drawbacks of the above mentioned known art.

DISCLOSURE OF THE INVENTION

In particular, it is an object of the present invention to provide a mould for moulding a container obtained from a parison of plastic material, that is structurally compact and allows to reduce the complexity of the transfer operations of parisons and containers in/out of said mould.

Another object of the present invention is to make available a method for moulding a container obtained from a parison of plastic material, which allows to decrease the interval of coincidence of the axis of the transfer gripper with the axis of symmetry of the mould. Another object of the present invention is to provide a mould for moulding a container obtained from a parison of plastic material, that can be efficiently applied both for parisons (and containers) with upward-oriented and downward-oriented mouth.

BRIEF DESCRIPTION OF DRAWINGS

Further characteristics and advantages of the present invention will become more apparent from the following approximate, and hence non-restrictive, description of a preferred, but non exclusive, embodiment of a mould for moulding a container obtained from a parison of plastic material and method thereof, as illustrated in the appended drawings, in which.

BEST MODE FOR CARRYING OUT THE INVENTION

With reference to the figures, 1 indicates a mould for moulding a container 2 obtained from a parison 3 of plastic material. For example, the mould 1 may be located on a linear or rotary carousel blow-moulding machine.

Figure 1:
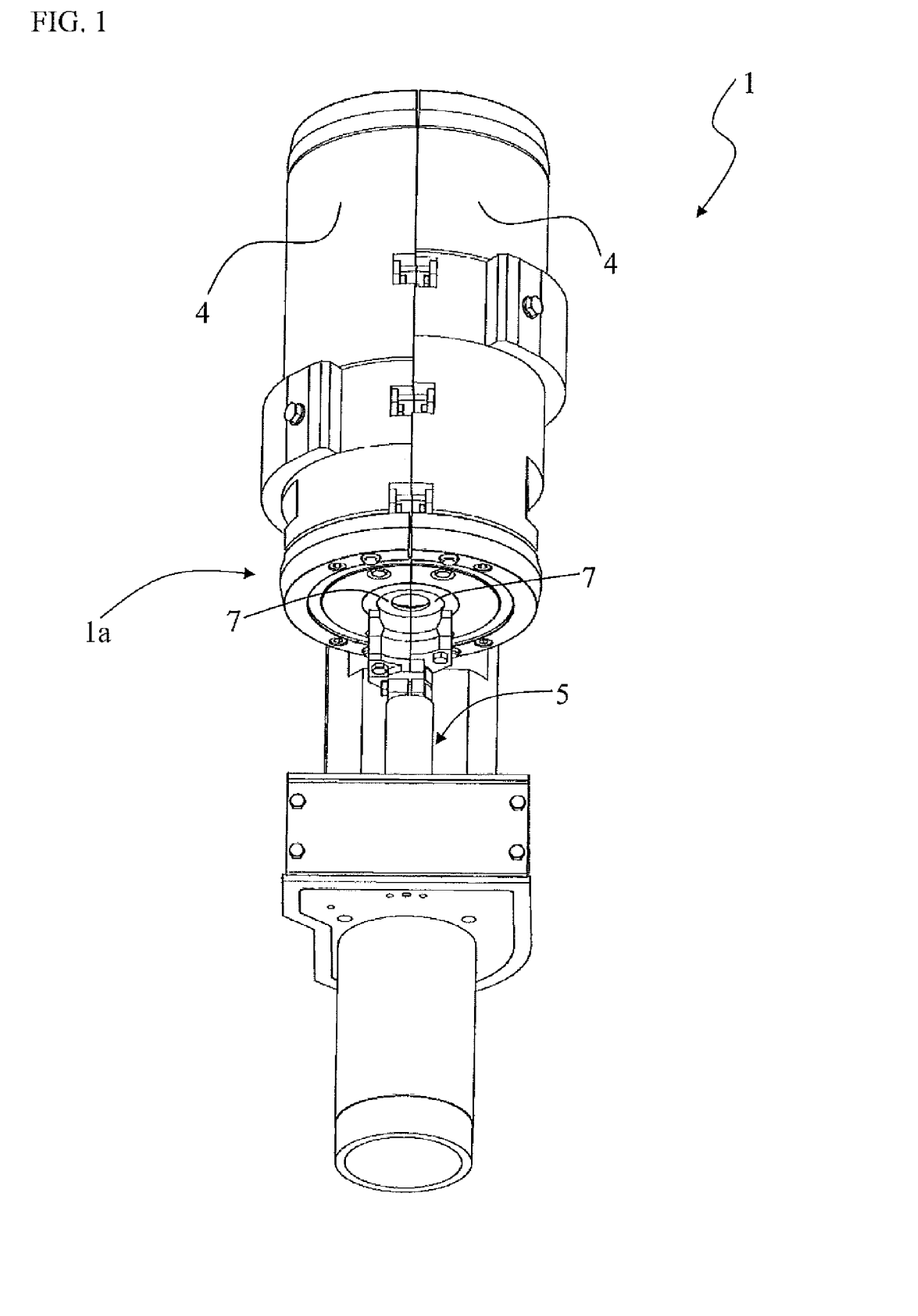
FIGS. 1 and 2 illustrate perspective views of a mould for moulding a container obtained from a parison of plastic material, in two different operating positions for the half-moulds, according to the present invention.
Figure 2:
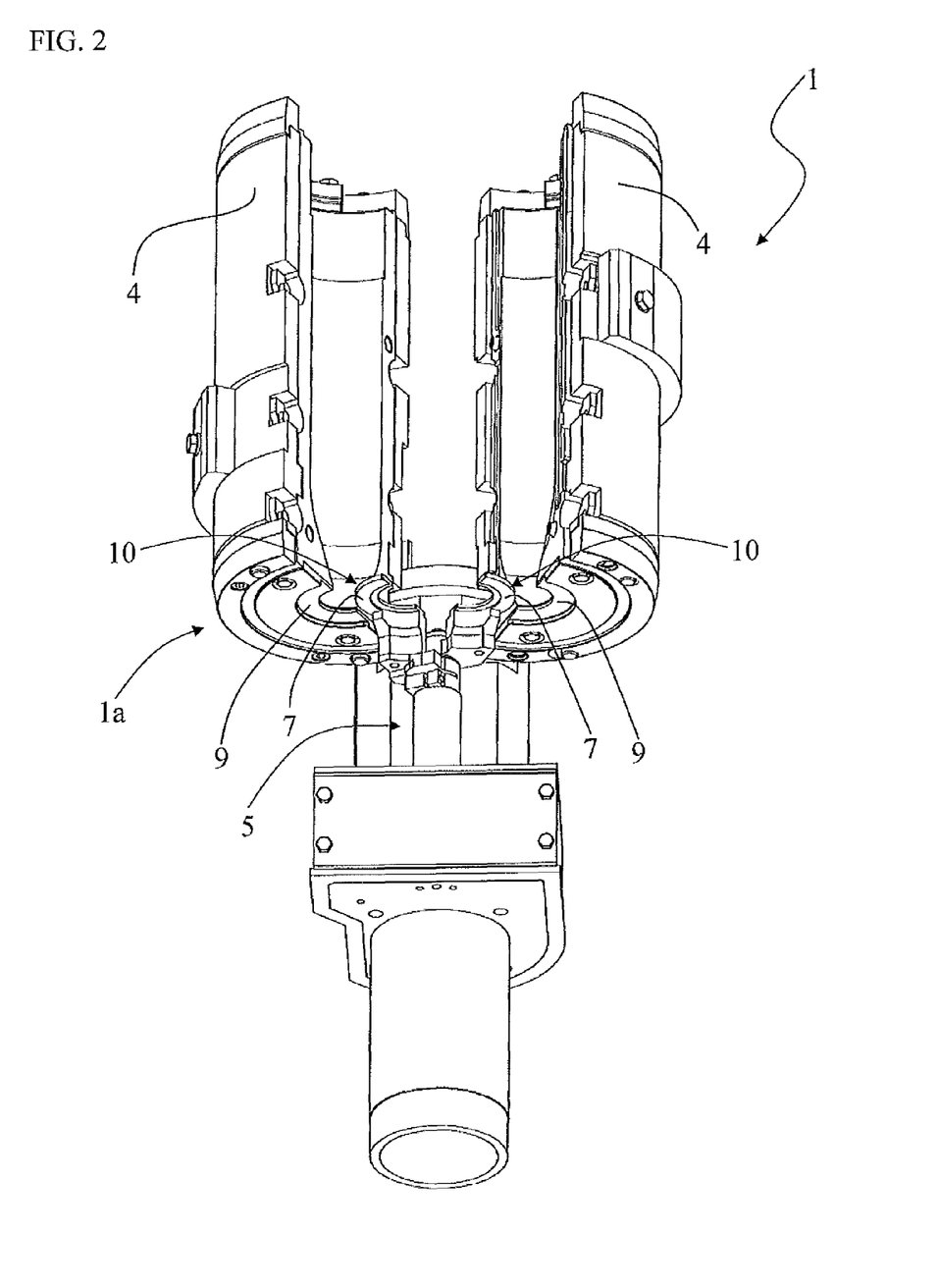
Figure 3:
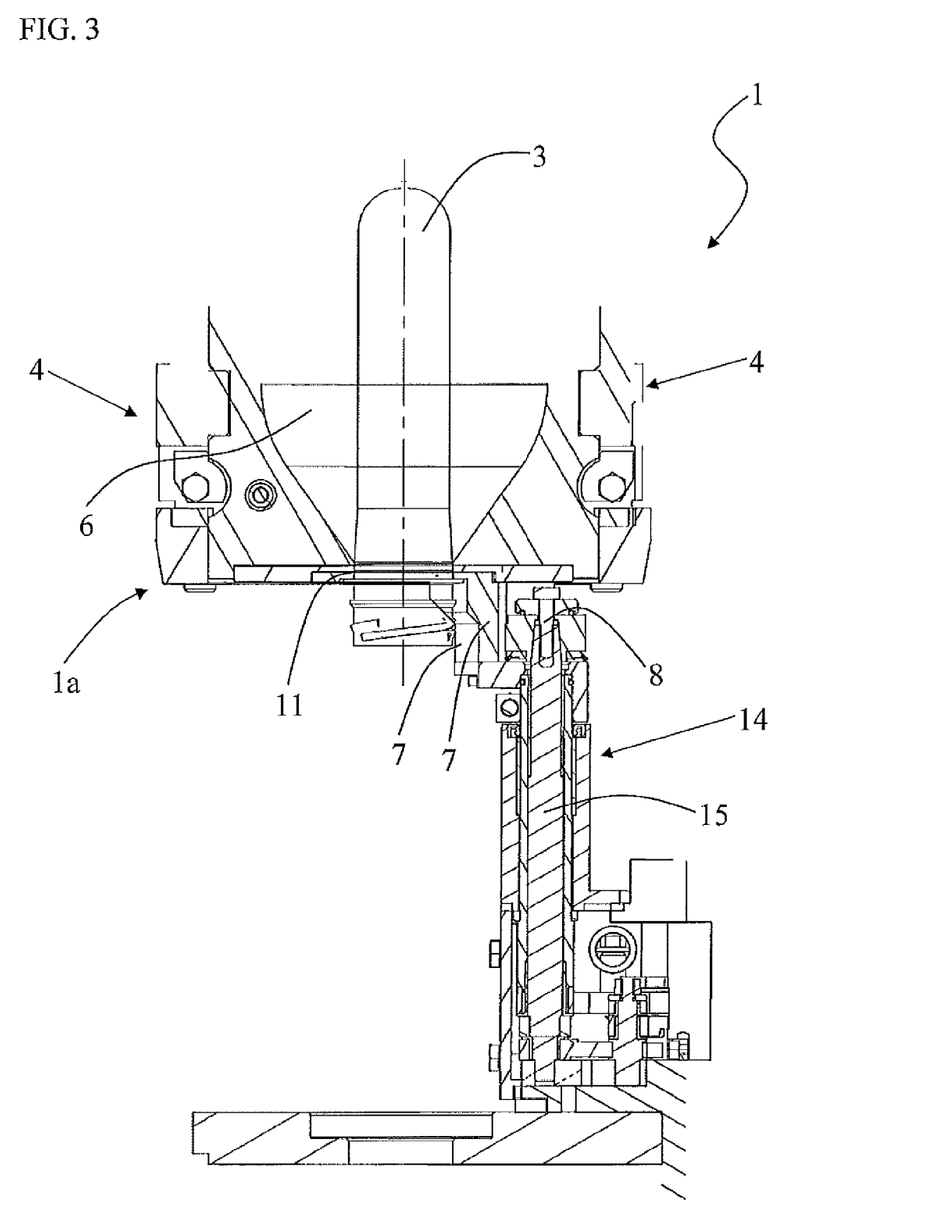
FIGS. 3 and 4 illustrate cutaway views of the mould of FIG. 1 (some parts have been removed for the sake of clarity)
Figure 4:
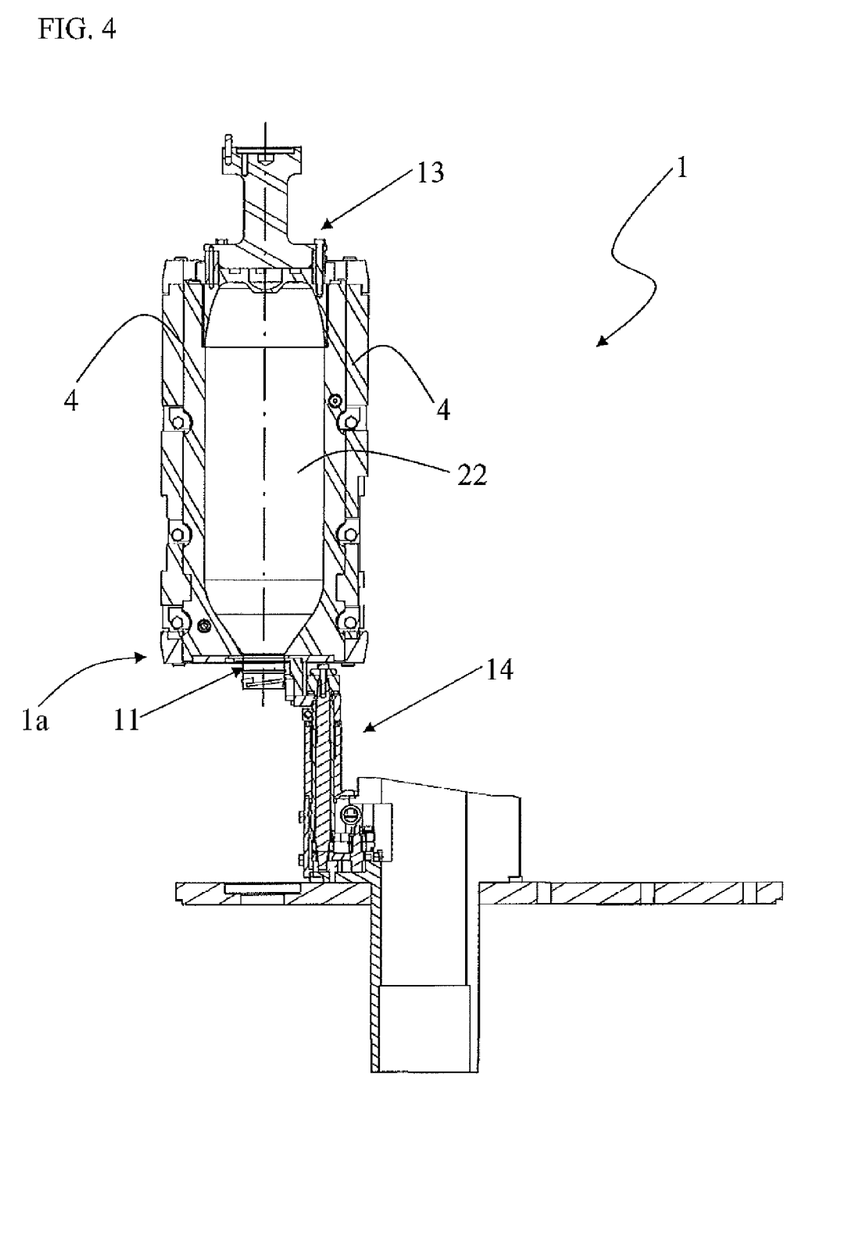

The mould 1 comprises two half-moulds 4 and means 5 for moving said half-moulds 4 between a closed position (shown in FIG. 1) and an open position (shown in FIG. 2). In particular, in the closed position, said half-moulds 4 define a cavity 6 (shown in FIG. 3) for housing the parison 3 or the moulded container 2. In the open position, said half-moulds 4 are moved away from each other to enable the extraction of the moulded container 2 from the cavity 6 or the insertion of another parison 3 in said cavity 6. Preferably, the mould 1 comprises two supports 24, each for integrally bearing one of said half-mould 4. In the embodiment described and illustrated herein, both supports 24 can rotate around a common axis 25 so that the mould 1 is of the "book" type.

In an alternative embodiment (not shown), the mould 1 is of the "alligator" type, with one support 24 fixed and the other one mobile by rotation around said common axis 25. In an additional embodiment (not shown), the mould 1 is of the "linear" type, i.e. the half-moulds 4 are moved towards and away from each other by a translating motion.

Preferably, the mould 1 is provided with a bottom plate 5 cooperating with the half-moulds 4 for shaping the bottom of the container 2.

The mould 1 comprises two jaws 7 movable between a configuration of engagement and a configuration of disengagement with the parison 3 or the container 2 located in the cavity 6. Preferably, the mould 1 includes pliers 14 formed by said two jaws 7 and by two actuating arms 15. The jaws 7 and the actuating arms 15 are pivoted in a fulcrum 8. In particular, the actuating arms 15 are arranged oppositely to said jaws 7 with respect to said fulcrum 8. In particular, the jaws 7, being pivoted in said fulcrum 8, can rotate around it between said configuration of engagement and said configuration of disengagement with the parison 3 or the container 2 located in the cavity 6. Preferably, the jaws 7 are provided with a rapid attack system so as to be quickly detachable from the mould 1.

The half-moulds 4 define an inner portion 9 of the mould that is complementarily shaped relative to an outer profile 10 of the jaws 7 in such a way that said jaws 7 are enclosed, at least partially, by said half-moulds 4. As illustrated in FIG. 2, the inner portion 9 of the mould 1 is located at an end section 1a of said mould 1, said end section 1a being so shaped as to receive a neck 11 of the parison 3 or of the container 2.

Figure 5:
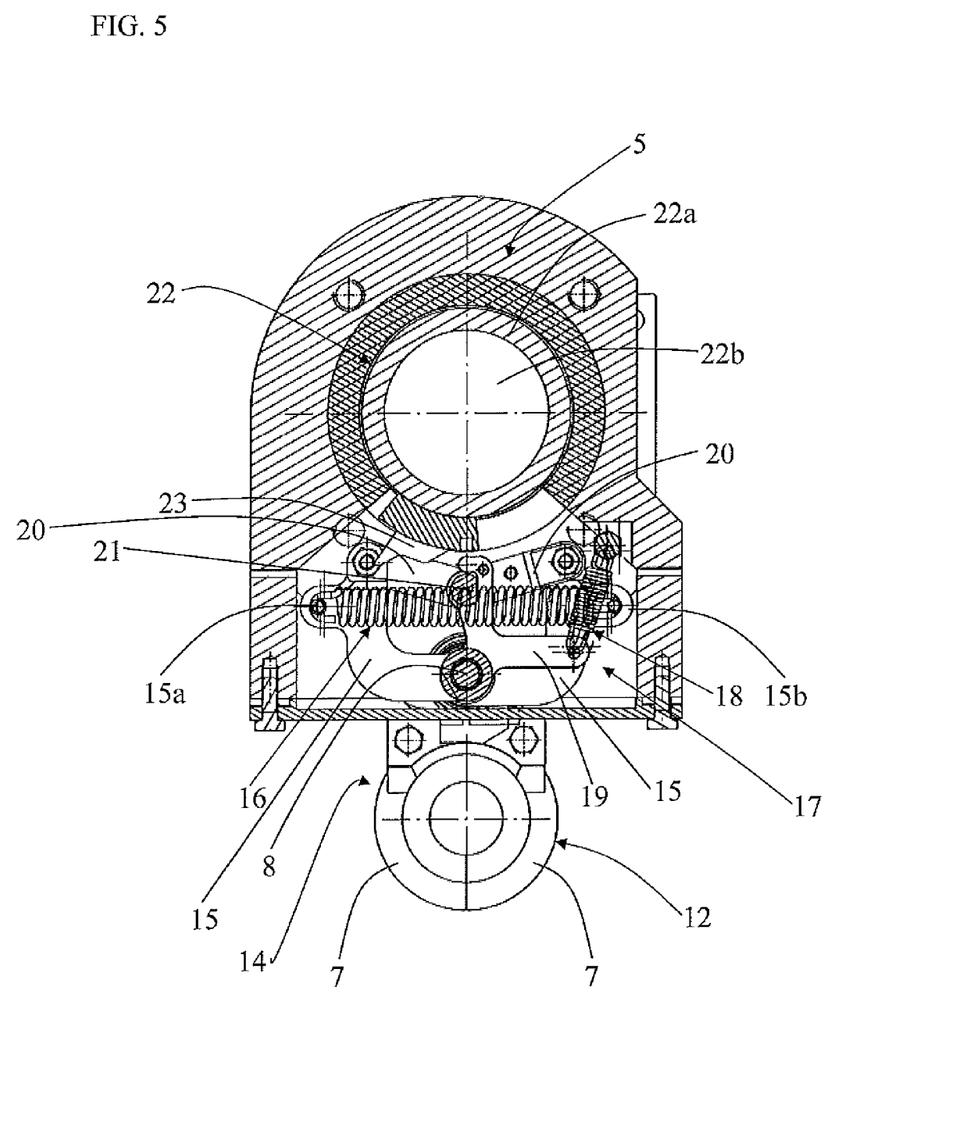
FIGS. 5 and 6 illustrate top views of a portion of the mould of FIG. 1 (some parts have been removed for the sake of clarity), corresponding to two different configurations for the jaws.

Preferably, in the engagement configuration, said jaws 7 are closed to form a ring 12 encircling the parison 3 or the container 2 in correspondence of its neck 11 (see FIG. 5). In particular, the outer profile 10 of the jaws 7 is defined by an external surface and a base of said ring 12. In this context, a ring is a solid body obtained by a bi-dimensional figure whose barycenter describes a closed line, i.e. the bi-dimensional figure is a circle, an ellipse or a polygon.

Alternatively, in the engagement configuration, the jaws 7 are closed to form a torus encircling the parison 3 or the container 2 in correspondence of its neck 11.

Figure 6:
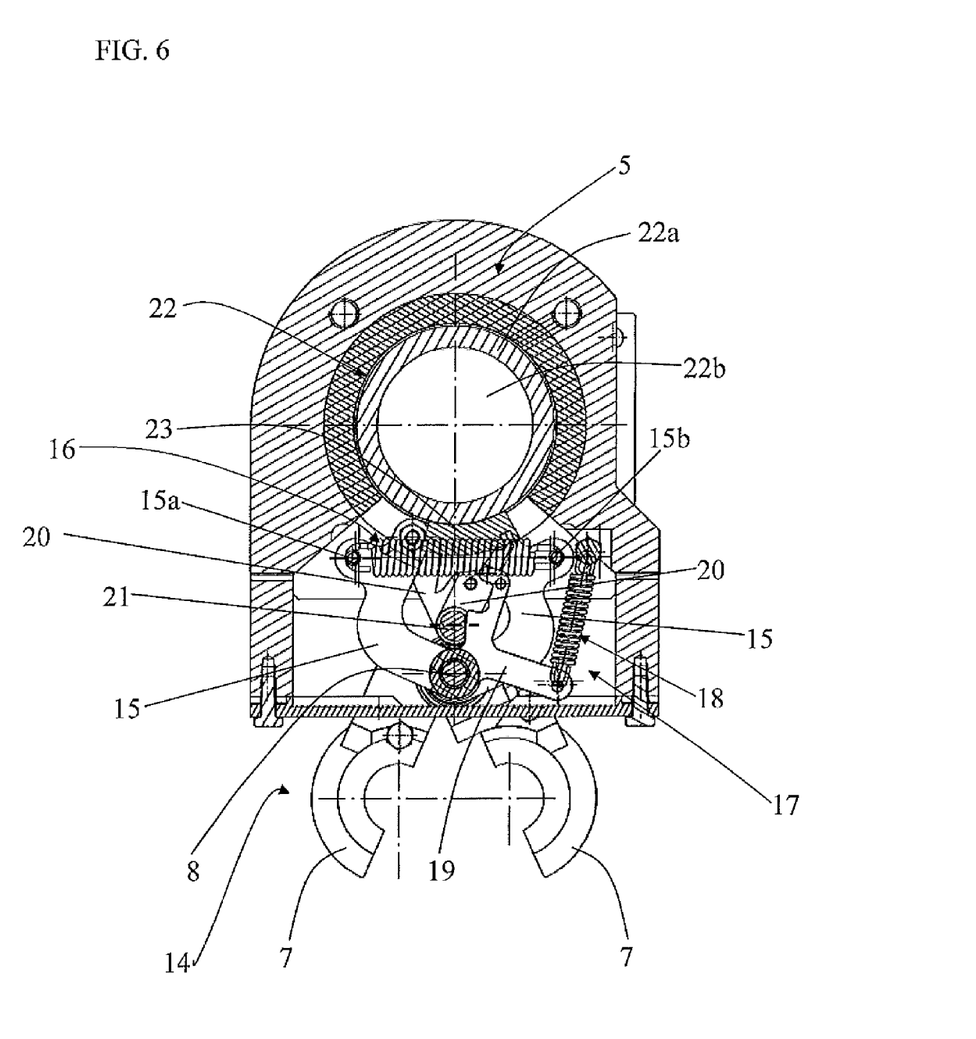

The pliers 14 are equipped with a first elastic member 16 movable from a loaded condition in which the jaws 7 are in the engagement configuration (shown in FIG. 5), to a released condition in which the jaws 7 are in the disengagement configuration (shown in FIG. 6). In particular, in this context, the expression "released condition" refers to a condition in which the elastic member 16 is totally released or partially released (i.e. the load has been reduced). The first elastic member 16 is secured between said actuating arms 15 and, in the loaded condition, is prevented by a locking assembly 17 to turn the actuating arms 15 by its tractive force. In particular, said elastic member 16 consists in a spring that is secured between free ends 15a, 15b of said actuating arms 15. Said free ends 15a, 15b are the ends of the actuating arms 15 not pivoted in the fulcrum 8.

The mould 1 comprises two connecting rods 20 for allowing a symmetric movement of the jaws from the disengagement to the engagement configuration and viceversa. The connecting rods 20 have first ends pivoted together in a pin 21 and second ends respectively pivoted in the free ends 15a, 15b of the actuating arms 15. Preferably, the pin 21 is movable along a dedicated guide, for example consisting in a linear groove.

The locking assembly 17 comprises a second elastic member 18 and a pawl 19. The second elastic member 18 (i.e. a spring) is operatively active on the pawl 19 so that, with the first elastic member 16 in the loaded condition, the pawl 19 meshes with said pin 21 and maintains it at a maximum distance from the fulcrum 8 (as shown in FIG. 5). Preferably, the pawl 19 meshes with an upper part of the pin 21.

The moving means 5 of the half-moulds 4 comprise at least a rotating shaft 22 bearing a cam 23 that, in response to the movement of the half-moulds 4 from the closed to the open position, pushes said pawl 19 so as to disengage the pin 21. Thus, the first elastic member 16 is allowed to pass from the loaded to the released condition (as shown in FIG. 6).

In the embodiment described and illustrated herein, the moving means 5 of the half-moulds 4 comprise a first rotating shaft 22a having the shape of a hollow cylinder and a second rotating shaft 22b having the shape of a cylinder. In particular, the first rotating shaft 22a bears said cam 23 and surrounds the second rotating shaft 22b. The first rotating shaft 22a and the second rotating shaft 22b have a coaxial development.

The method for moulding a container from a parison of plastic material, according to the present invention, is described hereafter.

Figure 7A:
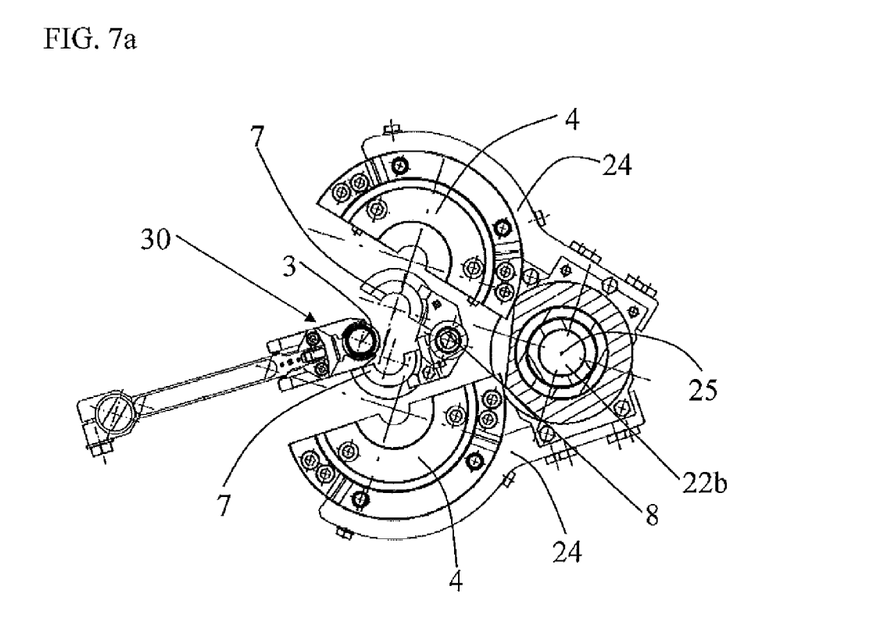
FIG. 7a-7f illustrate top views of the mould of FIG. 1, corresponding to different steps in the working process.
Figure 7B:
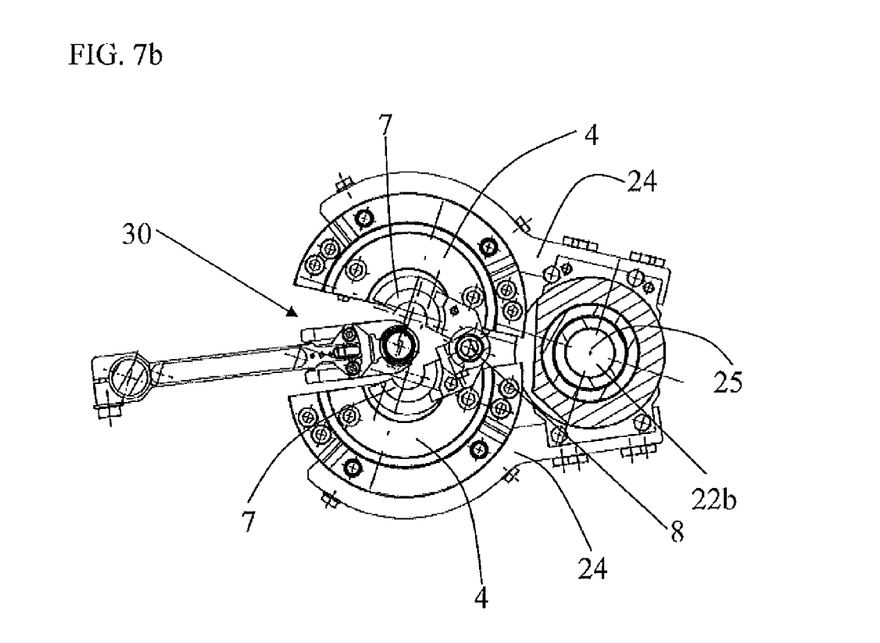
Figure 7C:
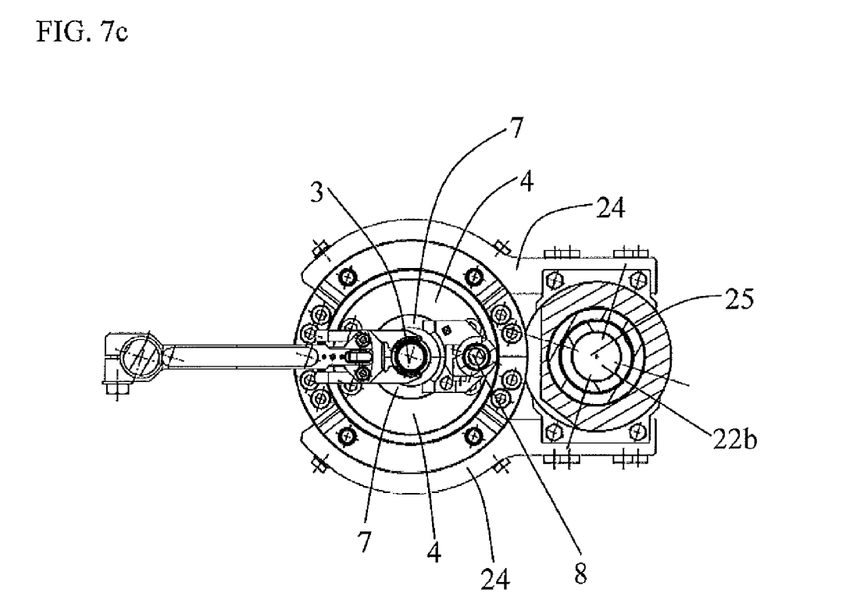

As shown in FIG. 7a, the parison 3 is inserted between the half-moulds 4 in the open position. It must be pointed out that, in this context, the "open position" of said half-moulds 4 does not necessarily correspond to a completely open position of the half-moulds 4, but merely to a position that allows the insertion of said parison 3. During the insertion, the parison 3 is supported by a first external gripper 30 (i.e. mounted on a star-wheel for transfering parisons). The half-moulds 4 mutually approach until they reach the closed position (shown in FIG. 7c). In the embodiment described and illustrated herein, during their mutual approaching, said half-moulds 4 push the jaws 7 closer so that said inner portion 9 of the mould 1 engages with the outer profile 10 of the jaws 7 (see FIG. 7b). Alternatively, the step of mutually approaching the jaws 7 is started before the step of mutually approaching the half-moulds 4. In this case, the jaws 7 are pushed closer by specific organs (not shown). However, the jaws 7 mutually approach until they engage the parison 3 in correspondence of its neck 11. Successively, the parison 3 is disengaged by the first external gripper 30.

In the case of the "book" mould 1, the supports 24 are rotated around the common axis 25 by rotating the first rotating shaft 22a and the second rotating shaft 22b so that the half-moulds 4 are brought closer. In the embodiment described and illustrated herein, the jaws 7 mutually approach by rotation around the fulcrum 8.

During the rotation of the jaws 7, the actuating arms 15 are rotated away from each other so that the elastic member 16 is loaded and maintained in the loaded condition by the locking assembly 17. In particular, the elastic member 16 is maintained in traction between the free ends 15a, 15b of the actuating arms 15. Indeed, the connecting 20 rods gradually move away from said fulcrum 8 until the pin 21 reaches the maximum distance from the fulcrum 8 and engages with the pawl 19. In particular, the pin 21 moves along the dedicated guide. The second elastic member 18, working in traction, prevents that the pawl 19 unmeshes from the pin 21.

The bottom plate 13 is moved towards said half-moulds 4 so as to engage with them. When the half-moulds 4 are in the closed position, the parison 3 is housed inside the cavity 6.

The parison 3 is then processed (e.g. by blowing and stretching) for obtaining the container 2.

Figure 7D:
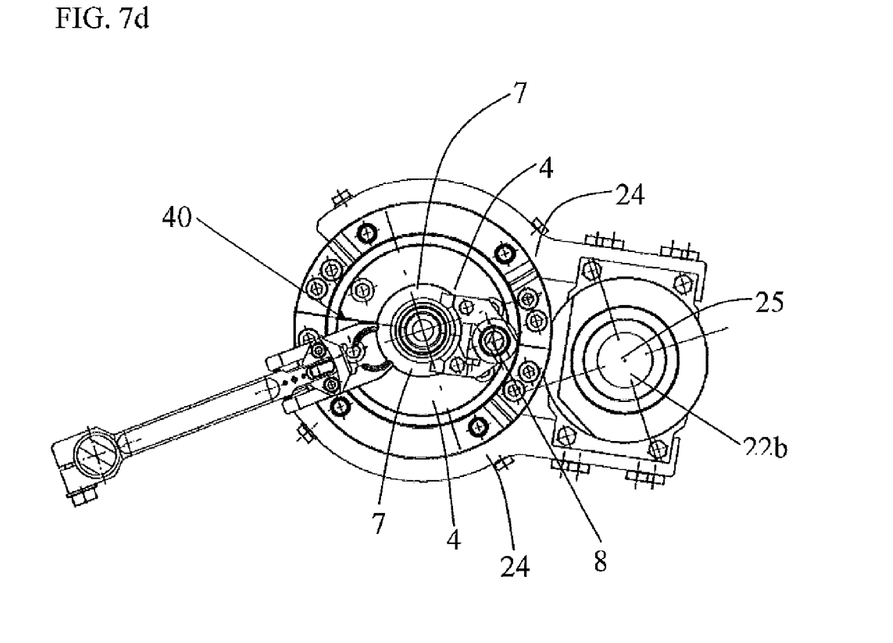
Figure 7E:
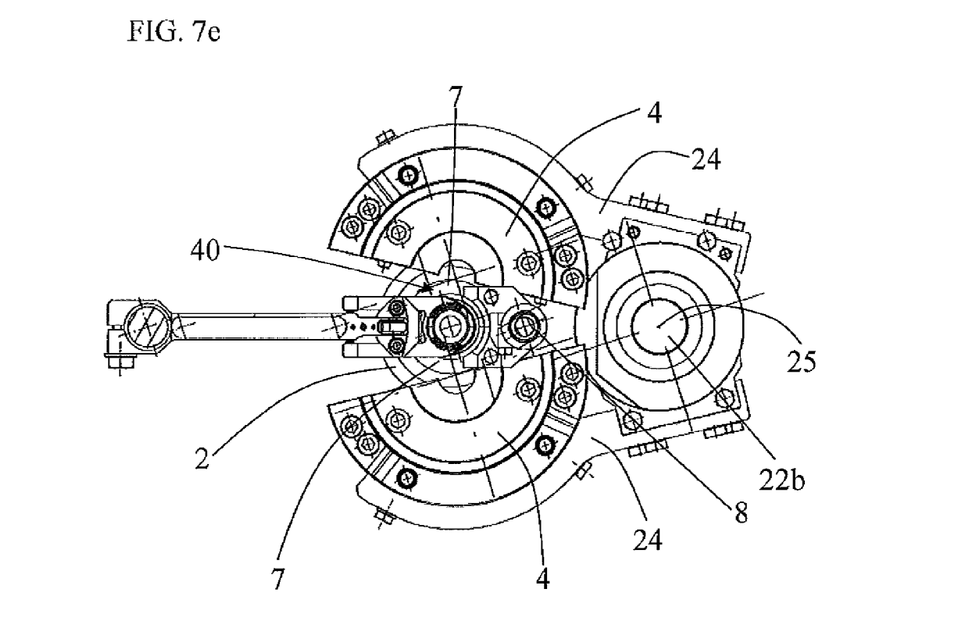
Figure 7F:
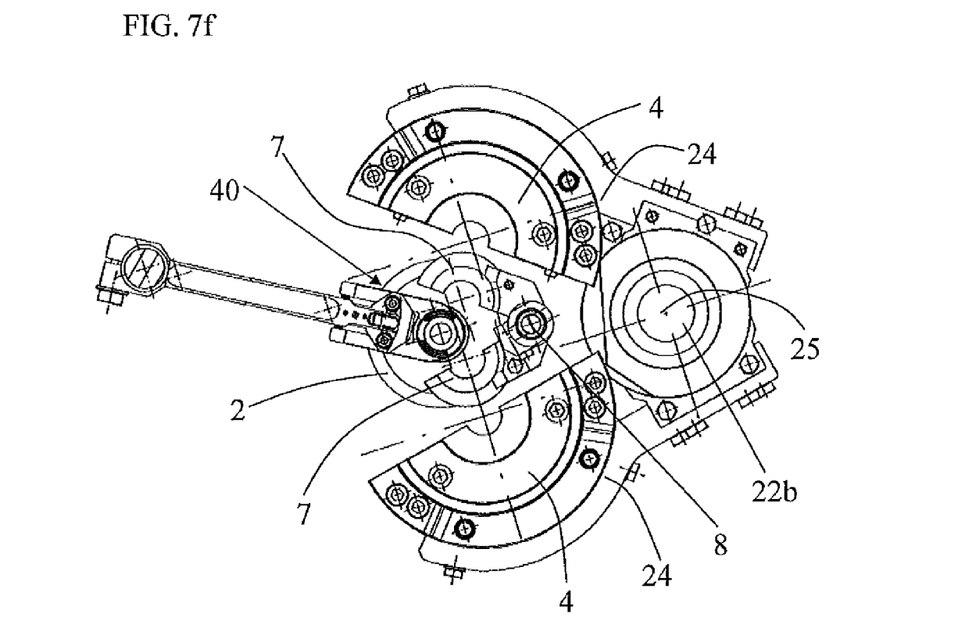

After the processing step, the half-moulds 4 are moved away from each other. In particular, the supports 24 are rotated around the common axis 25 (thanks to the rotating shafts 22a, 22b) so that the half-moulds 4 are brought away from each other. Contemporaneously, the bottom plate 13 is moved away from said half-moulds 4 so as to disengage from them. During this step, a second external gripper 40 (i.e.

mounted on a star-wheel for transfering containers) engages with the container 2 for supporting it (see FIG. 7*d*-7*e*). As soon as the second external gripper 40 engages with the container 2, the cam 23, integral to the first rotating shaft 22*a*, approaches the locking assembly 17 and pushes the pawl 19 out of said pin 21. Alternatively, the pawl 19 is pushed out of the pin 21 by means of an external cam (i.e. beared by the second external gripper 40). In any case, the first elastic member 16 is released and the jaws 7 move immediately away from each other until they disengage the container 2 (see FIG. 7*f*). In the meantime, the half-moulds 4 complete their moving away and reach the open position again. Finally, the container 2 is extracted from the open half-moulds 4 by means of said second external gripper 40.

From the above description, the characteristics of the mould for moulding a container obtained from a parison of plastic material and method thereof, according to the present invention, are clear, as are their advantages.

In particular, thanks to the fact that the jaws are enclosed by the half-moulds, the proposed mould is very compact.

Moreover, the complementarity of the inner portion of the mould and the outer profile of the jaws allows to obtain a structurally simple solution.

Moreover, since the jaws are brought closer by means of the pushing action of the half-moulds, it is assured that the closing of the jaws is in phase with the closing of the half-moulds. Moreover, thanks to the employment of the first elastic member and the locking assembly, the opening of the jaws is almost instantaneous. Moreover, thanks to the delayed opening of the jaws related to the opening of the mould, the proposed method allows to decrease the interval of coincidence of the axis of the external gripper with the axis of symmetry of the mould during the extraction of the container.

Furthermore, the mould can be employed both for parisons (and containers) with upward-oriented and downward-oriented mouth.

Finally, the jaws are able to counteract to the mechanical forces exerted by the external grippers.

The invention claimed is:

1. Mould (1) for moulding a container (2) obtained from a parison (3) of plastic material, comprising:
   two half-moulds (4);
   means (5) for moving said half-moulds (4) between a closed position in which said half-moulds (4) define a cavity (6) for housing the parison (3) or the moulded container (2), and an open position in which said half-moulds (4) are moved away from each other to enable the extraction of the moulded container (2) from the cavity (6) or the insertion of another parison (3) in said cavity (6);
   two jaws (7) movable between a configuration of engagement and a configuration of disengagement with the parison (3) or the container (2) located in said cavity (6),
   said half-moulds (4) defining an inner portion (9) of the mould (1) that is complementarily shaped relative to an outer profile (10) of the jaws (7) in such a way that said jaws (7) are enclosed, at least partially, by said half-moulds (4), said inner portion (9) of the mould (1) being located at an end section (1*a*) of said mould (1), said end section (1*a*) being so shaped as to receive a neck (11) of the parison (3) or of the container (2),
   characterised in that it further comprises pliers (14) formed by said jaws (7), that are pivoted in a fulcrum (8), and by two actuating arms (15) that are pivoted in said fulcrum (8) and arranged oppositely to said jaws (7) with respect to said fulcrum (8), said pliers (14) being equipped with a first elastic member (16) movable from a loaded condition in which the jaws (7) are in the engagement configuration, to a released condition in which the jaws (7) are in the disengagement configuration.

2. Mould (1) according to claim 1, wherein said jaws (7), in the engagement configuration, are closed to form a ring (12) encircling the parison (3) or the container (2) in correspondence of its neck (11), said outer profile (10) being defined by an external surface and a base of said ring (12).

3. Mould (1) according to claim 1, further comprising two connecting rods (20) having first ends pivoted together in a pin (21) and second ends respectively pivoted in free ends (15*a*, 15*b*) of said actuating arms (15), said pin (21) being movable along a dedicated guide.

4. Mould (1) according to claim 3, wherein said first elastic member (16) is secured between said actuating arms (15) and, in the loaded condition, is prevented by a locking assembly (17) to turn the actuating arms (15) by its tractive force.

5. Mould (1) according to claim 4, wherein said locking assembly (17) comprises a second elastic member (18) and a pawl (19), said second elastic member (18) being operatively active on the pawl (19) so that, with the first elastic member (16) in the loaded condition, the pawl (19) meshes with said pin (21) and maintains it at a maximum distance from said fulcrum (8).

6. Mould (1) according to claim 5, wherein said moving means (5) of the half-moulds (4) include at least a rotating shaft (22) bearing a cam (23) that, in response to the movement of the half-moulds (4) from the closed to the open position, pushes said pawl (19) so as to disengage said pin (21), thus allowing the first elastic member (16) to pass from the loaded to the released condition.

7. Method for moulding a container (2) from a parison (3) of plastic material, comprising the following steps:
   inserting the parison (3) between two half-moulds (4) in an open position;
   mutually approaching said half-moulds (4) until they reach a closed position so as to define a cavity (6) for housing the parison (3);
   mutually approaching two jaws (7) until they engage the parison (3) in correspondence of its neck (11) by rotating said jaws (7) around a pivoting fulcrum (8), said jaws (7) being part of pliers (14) including two actuating arms (15) also pivoted in said fulcrum (8) but oppositely to said jaws (7), when said half-moulds (4) reach the closed position, an inner portion (9) of the mould (1) engaging with an outer profile (10) of the jaws (7), said inner portion (9) being complementarily shaped relative to said outer profile (10);
   processing the parison (3) for obtaining the container (2);
   moving said half-mould (4) away from each other until they reach said open position;
   moving said jaws (7) away from each other until they disengage said container (2);
   extracting the container (2) from the open half-moulds (4), characterised in that, during rotating said jaws (7) around the fulcrum (8), said actuating arms (15) are rotated away from each other so that an elastic member (16), which is secured between said actuating arms (15), is loaded and maintained in a loaded condition.

8. Method according to claim 7, wherein, during the step of mutually approaching the half-moulds (4), said half-moulds (4), at least partially enclosing the jaws (7), push said jaws (7) closer so that said inner portion (9) of the mould (1) engages with said outer profile (10) of the jaws (7).

9. Method according to claim 7, wherein the step of moving said half-mould (4) away from each other is started before the step of moving said jaws (7) away from each other.

10. Method according to claim 7, wherein the step of blocking said elastic member (16) in the loaded condition consists in gradually moving two connecting rods (20) away from said fulcrum (8) until a pin (21) in which first ends of said connecting rods (20) are pivoted reaches a maximum distance from said fulcrum (8) and engages with a pawl (19), said connecting rods (20) having second ends respectively pivoted in free ends (15*a*, 15*b*) of said actuating arms (15).

11. Method according to claim 10, wherein the step of mutually approaching said half-moulds (4) consists in rotating at least a rotating shaft (22) bearing a cam (23) so that said cam (23) pushes the pawl (19) out of said pin (21) and the first elastic member (16) is released.

* * * * *